United States Patent
Saboo et al.

(10) Patent No.: US 12,084,752 B2
(45) Date of Patent: Sep. 10, 2024

(54) STAINLESS STEEL POWDERS FOR ADDITIVE MANUFACTURING

(71) Applicant: QUESTEK INNOVATIONS LLC, Evanston, IL (US)

(72) Inventors: Abhinav Saboo, Evanston, IL (US); Ricardo Komai, Evanston, IL (US); Dana Frankel, Evanston, IL (US); Marie Thomas, Evanston, IL (US); Greg Olson, Evanston, IL (US)

(73) Assignee: QUESTEK INNOVATIONS LLC, Evanston, IL (US)

( * ) Notice: Subject to any disclaimer, the term of this patent is extended or adjusted under 35 U.S.C. 154(b) by 0 days.

(21) Appl. No.: 17/977,622

(22) Filed: Oct. 31, 2022

(65) Prior Publication Data

US 2023/0134452 A1    May 4, 2023

Related U.S. Application Data

(60) Provisional application No. 63/274,141, filed on Nov. 1, 2021.

(51) Int. Cl.

| | | |
|---|---|---|
| *C22C 38/50* | (2006.01) | |
| *B33Y 70/00* | (2020.01) | |
| *C22C 38/00* | (2006.01) | |
| *C22C 38/42* | (2006.01) | |
| *C22C 38/44* | (2006.01) | |
| *C22C 38/46* | (2006.01) | |
| *C22C 38/48* | (2006.01) | |
| *B33Y 10/00* | (2015.01) | |

(52) U.S. Cl.
CPC .............. *C22C 38/50* (2013.01); *B33Y 70/00* (2014.12); *C22C 38/001* (2013.01); *C22C 38/002* (2013.01); *C22C 38/42* (2013.01); *C22C 38/44* (2013.01); *C22C 38/46* (2013.01); *C22C 38/48* (2013.01); *B22F 2201/11* (2013.01); *B22F 2301/35* (2013.01); *B33Y 10/00* (2014.12)

(58) Field of Classification Search
CPC ........ B22F 10/28; B22F 10/32; B22F 10/366; B22F 2201/11; B22F 2301/35; B33Y 10/00; B33Y 50/02; B33Y 70/00; C22C 33/0285; C22C 38/001; C22C 38/002; C22C 38/42; C22C 38/44; C22C 38/46; C22C 38/48; C22C 38/50; Y02P 10/25
See application file for complete search history.

(56) References Cited

U.S. PATENT DOCUMENTS

| | | |
|---|---|---|
| 2003/0049153 A1 | 3/2003 | Martin et al. |
| 2009/0047165 A1 | 2/2009 | Syvanen et al. |
| 2016/0333450 A1 | 11/2016 | Ikeda et al. |
| 2018/0119239 A1 | 5/2018 | Tuffile et al. |
| 2019/0160595 A1 | 5/2019 | Narayanan et al. |
| 2021/0138543 A1 | 5/2021 | Maskrot et al. |

FOREIGN PATENT DOCUMENTS

| | | |
|---|---|---|
| EP | 1992709 A1 | 11/2008 |
| EP | 3121306 A1 | 1/2017 |
| JP | S63171857 A | 7/1988 |
| JP | H10102105 A * | 4/1998 |
| JP | 2015189981 A | 11/2015 |
| JP | 2017025392 A | 2/2017 |
| JP | 2018178144 A | 11/2018 |
| WO | 8704731 A1 | 8/1987 |
| WO | 2001/031076 A1 | 5/2001 |
| WO | 2021/123894 A1 | 6/2021 |

OTHER PUBLICATIONS

Effects of atomizing media and post processing on mechanical properties of 17-4 PH stainless steel manufactured via selective laser melting (Year: 2018).*
Distinct properties of tungsten austenitic stainless alloy as a potential nuclear engineering material (Year: 2019).*
Stainless Steel Precipitation hardening 15-5PH (Year: 2019).*
Ghosh et al., "Kinetics of F.C.C.—>B.C.C. Heterogeneous Martensitic Nucleation—I. The Critical Driving Force for Athermal Nucleation", Acta Metall. Mater., vol. 42, 1994, pp. 3361-3370.
Meier et al., "Critical Influences of Particle Size and Adhesion on the Powder Layer Uniformity in Metal Additive Manufacturing", arXiv, 2018, 27 pages.
Mindt et al., "Powder bed layer characteristics: the overseen first-order process input", Metallurgical and Materials Transactions A, vol. 47, No. 8, 2016, pp. 3811-3822.
Vunnam et al., "Effect of powder chemical composition on the as-built microstructure of 17-4 PH stainless steel processed by selective laser melting", Additive Manufacturing, vol. 30, 2019, 12 pages.

(Continued)

*Primary Examiner* — Jenny R Wu
(74) *Attorney, Agent, or Firm* — Michael Best & Friedrich LLP

(57) ABSTRACT

Exemplary alloys may comprise, by weight percentage, 13.25% to 14.75% chromium; 4.5% to 5.5% nickel; 0.11% to 0.17% carbon; 0.01% to 0.31% titanium; and the balance of weight percent comprising iron and incidental elements and impurities. Exemplary methods may include conducting additive manufacturing with an atomized alloy powder to generate a manufactured article, where the atomized alloy powder may comprise, by weight percentage, 13.25% to 14.75% chromium; 4.5% to 5.5% nickel; 0.11% to 0.17% carbon; 0.01% to 0.31% titanium; and the balance of weight percent comprising iron and incidental elements and impurities.

12 Claims, 9 Drawing Sheets

(6 of 9 Drawing Sheet(s) Filed in Color)

(56) References Cited

OTHER PUBLICATIONS

European Patent Office Extended Search Report for Application No. 21184876.7 dated Oct. 11, 2021 (12 pages).
Schaller et al., "Corrision Properties of Powder Bed Fusion Additively Manufactured 17-4 PH Stainless Steel", Corrision, National Association of Corrision Engineers, 2017, vol. 73, No. 1, pp. 796-807.
Japanese Patent Office Notice of Reasons for Refusal for Application No. 2021114014 dated Nov. 2, 2022 (10 pages including English translation).
European Patent Office Extended Search Report for Application No. 22204711.0 dated Mar. 22, 2023 (8 pages).

* cited by examiner

STAINLESS STEEL POWDERS FOR ADDITIVE MANUFACTURING

CROSS-REFERENCE TO RELATED APPLICATION(S)

This application claims priority to U.S. Provisional Patent Application No. 63/274,141, filed on Nov. 1, 2021, the contents of which are incorporated herein by reference.

GOVERNMENT INTEREST

This invention was made with government support under contract number N68335-18-C-0020 awarded by the U.S. Department of Defense. The government has certain rights in the invention.

TECHNICAL FIELD

The present disclosure relates to materials, methods and techniques for stainless steel alloy powders. More particularly, exemplary stainless steel alloy powders are suited for additive manufacturing implementations.

INTRODUCTION

Additive manufacturing (AM) is a process of fabricating components in a layer-by-layer method under the control of computer-aided design (CAD) information, rather than by the traditional use of casting molds and forming dies. Additive manufacturing technologies such as Selective Laser Melting (SLM), also known as Laser Powder Bed Fusion (LPBF), have matured significantly in recent years.

By allowing for net-shape fabrication of highly complex geometries without molds or machining, additive manufacturing offers the potential to reduce material usage, energy consumption, component cost, and fabrication time. Additive manufacturing allows for rapid component production, one-off production of difficult-to-source parts, and production of parts difficult to produce by conventional means (such as complex geometries that cannot be machined or cast). As a result, additive manufacturing can provide flexibility in part manufacturing to original equipment manufacturers as well as end users acquiring custom or replacement parts.

SUMMARY

Materials, methods and techniques disclosed and contemplated herein relate to steel alloys that are particularly adapted for additive manufacturing applications. In some instances, steel alloys may include chromium, nickel, carbon, titanium, and the balance iron and incidental elements and impurities. In some instances, steel alloys may include chromium, nickel, carbon, titanium, vanadium, tungsten, molybdenum, and the balance iron and incidental elements and impurities.

In one aspect, an alloy is disclosed. The example alloy may comprise, by weight percentage: 13.25% to 14.75% chromium; 4.5% to 5.5% nickel; 0.11% to 0.17% carbon; 0.01% to 0.31% titanium; no more than 0.01% copper; no more than 0.01% manganese; no more than 0.02% nitrogen; no more than 0.04% oxygen; and the balance of weight percent comprising iron and incidental elements and impurities.

In another aspect, an atomized alloy powder usable in additive manufacturing is disclosed. The example atomized alloy powder may comprise, by weight percentage: 13.25% to 14.75% chromium; 4.5% to 5.5% nickel; 0.11% to 0.17% carbon; 0.01% to 0.31% titanium; no more than 0.01% copper; no more than 0.01% manganese; no more than 0.02% nitrogen; no more than 0.04% oxygen; and the balance of weight percent comprising iron and incidental elements and impurities.

In another aspect, a method of using an atomized alloy powder in additive manufacturing is disclosed. The example method may comprise receiving the atomized alloy powder comprising alloyed particles, conducting additive manufacturing with the atomized alloy powder to generate a manufactured article, the additive manufacturing being performed under an argon (Ar) atmosphere; and removing a manufactured article. The example alloyed particles may comprise, by weight percentage: 13.25% to 14.75% chromium; 4.5% to 5.5% nickel; 0.11% to 0.17% carbon; 0.01% to 0.31% titanium; no more than 0.01% copper; no more than 0.01% manganese; no more than 0.02% nitrogen; no more than 0.04% oxygen; and the balance of weight percent comprising iron and incidental elements and impurities.

In another aspect, an alloy is disclosed. The example alloy may comprise, by weight percentage: 13.25% to 14.75% chromium; 4.5% to 5.5% nickel; 0.11% to 0.15% carbon; 0.02% to 0.14% titanium; no more than 0.01% copper; no more than 0.01% manganese; no more than 0.02% nitrogen; no more than 0.04% oxygen; and the balance of weight percent comprising iron and incidental elements and impurities.

In another aspect, an additively manufactured article is disclosed. The example additively manufactured article may be generated using a method comprising receiving the atomized alloy powder comprising alloyed particles, conducting additive manufacturing with the atomized alloy powder to generate an additively manufactured article, the additive manufacturing being performed under an argon (Ar) atmosphere; and removing an additively manufactured article. The example alloyed particles and/or the additively manufactured article may comprise, by weight percentage: 13.25% to 14.75% chromium; 4.5% to 5.5% nickel; 0.13% to 0.17% carbon; 0.01% to 0.31% titanium; 0.01% to 0.21% vanadium; 0.4% to 0.6% tungsten; 0.4% to 0.6% molybdenum; no more than 0.01% copper; no more than 0.01% manganese; no more than 0.02% nitrogen; no more than 0.04% oxygen; and the balance of weight percent comprising iron and incidental elements and impurities.

There is no specific requirement that a material, technique or method relating to stainless steel alloy powders include all of the details characterized herein, in order to obtain some benefit according to the present disclosure. Thus, the specific examples characterized herein are meant to be exemplary applications of the techniques described, and alternatives are possible.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1A:
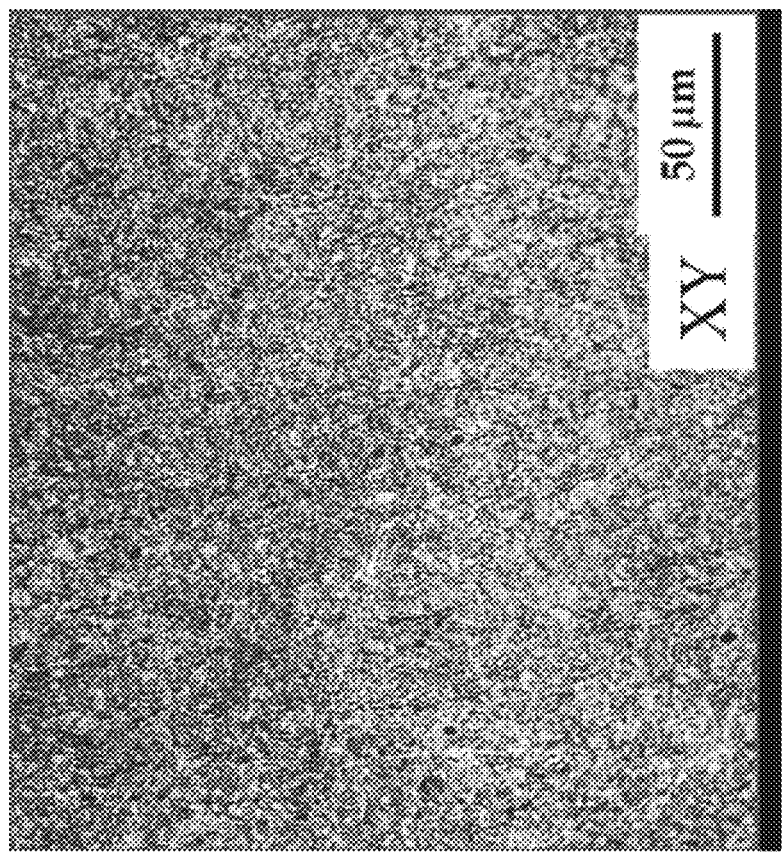
FIG. 1A is an optical micrograph of an experimental Example Alloy 1 in as-built condition, taken parallel to the build plate (an x-y specimen).

Materials, methods and techniques disclosed and contemplated herein relate to stainless steel alloys. Alloys disclosed and contemplated herein are well suited for additive manufacturing applications. For instance, an atomized alloy powder usable in additive manufacturing may include alloy particles comprising various alloys disclosed and contemplated herein.

Generally, exemplary alloy powders may be designed to provide suitable properties and characteristics in as-built condition. Exemplary alloys have compositions that are typically copper free. Exemplary alloys can have a microstructure that is majority martensite in as-built condition and/or after stress relief and/or Stage I temper. In some instances, exemplary alloys may include greater amounts of nickel than a 17-4 alloy composition. Without being bound by a particular theory, it is theorized that increased nickel content can improve toughness of resulting manufactured articles and/or accommodate defects such as pores. In some instances, exemplary alloys utilize ε-carbides which can provide strength via "auto-tempering." In some instances, exemplary alloys may also include molybdenum and tungsten, which can provide solid solution strengthening and/or resistance to intergranular stress corrosion cracking.

I. Example Steel Alloys

Example steel alloys are described below regarding example components and amounts, phase and microstructure characteristics, and physical properties. As discussed elsewhere, exemplary steel alloys are particularly suited for powder based additive manufacturing implementations. In various implementations, exemplary alloys can have sufficient toughness to survive printing and subsequent operations without significant heat treatment. In various implementations, exemplary alloys can have tolerance for pores and surface irregularity through toughening of the matrix. In various implementations, exemplary alloys can have sufficient pitting resistance with high chromium content.

A. Example Components and Amounts

Exemplary steel alloys disclosed and contemplated herein include various components at various amounts. For instance, example steel alloys may include iron and one or more of: chromium (Cr), nickel (Ni), carbon (C), and titanium (Ti). In some instances, example steel alloys may additionally comprise vanadium (V), tungsten (W), and molybdenum (Mo). In some instances, example steel alloys can additionally include one or more incidental elements and impurities, such as, silicon (Si), tantalum (Ta), copper (Cu), manganese (Mn), niobium (Nb), nitrogen (N), oxygen (O), phosphorous (P), and sulfur (S).

Exemplary steel alloys do not include any, or include less than 0.01 wt % of, copper. Copper is typically the strengthener in a 17-4PH alloy because it forms a nano-dispersion of pure copper precipitates. However, those precipitates can only be nucleated with a sufficient temper. Because the instant exemplary alloys are designed to only undergo basic heat treatment for stress relief and tempering of martensite, copper is not a significant contributor for strength and, accordingly, is used in trace amounts or not used at all.

Exemplary steel alloys may include increased carbon content as compared to 17-4PH alloys. Increased carbon content can promote ε-carbides ($Fe_{2.4}C$) particles to harden and toughen the material in a Stage I temper (such as at 200° C. up to 1 hour), which may be achieved via an "autotempering" process, which may be residual heating during the build.

In some instances, exemplary steel alloys may include small amounts of molybdenum and/or tungsten, which can improve corrosion resistance and grain boundary cohesion to resist intergranular fracture. In some instances, exemplary steel alloys include less than 0.01 wt % molybdenum and/or less than 0.01 wt % tungsten and/or less than 0.01 wt % vanadium.

Example steel alloys may include chromium. For instance, example steel alloys may include, by weight, 13.25% to 14.75% chromium (Cr). In various implementations, example steel alloys may include, by weight, 13.25% to 15% Cr; 13.25% to 14.75% Cr; 13.5% to 14.5% Cr; 13.25% to 13.75% Cr; 13.75% to 14.25% Cr; 14.25% to 14.75% Cr; 13.3% to 13.5% Cr; 13.5% to 13.7% Cr; 13.7% to 13.9% Cr; 13.9% to 14.1% Cr; 14.1% to 14.3% Cr; 14.3% to 14.5% Cr; or 14.5% to 14.7% Cr. In various implementations, example steel alloys may include, by weight, at least 13.25% Cr; at least 13.5% Cr; at least 13.75% Cr; at least 14.0% Cr; at least 14.25% Cr; or at least 14.5% Cr. In various implementations, example steel alloys may include, by weight, no more than 14.75% Cr; no more than 14.5% Cr; no more than 14.25% Cr; no more than 14.0% Cr; no more than 13.75% Cr; or no more than 13.5% Cr.

Example steel alloys may include nickel. For instance, exemplary steel alloys may include, by weight, 4.5% to 5.5% nickel (Ni). In various implementations, exemplary steel alloys may include, by weight, 4.5% to 5.3% Ni; 4.7% to 5.5% Ni; 4.5% to 5.1% Ni; 4.7% to 5.3% Ni; 4.9% to 5.5% Ni; 4.7% to 5.1% Ni; 4.9% to 5.3% Ni; 5.1% to 5.5% Ni; 4.5% to 4.7% Ni; 4.7% to 4.9% Ni; 4.9% to 5.1% Ni; 5.1% to 5.3% Ni; or 5.3% to 5.5% Ni. In various implementations, exemplary steel alloys may include, by weight, at least 4.5% Ni; at least 4.75% Ni; at least 5.0% Ni; or at least 5.25% Ni. In various implementations, exemplary steel alloys may include, by weight, no more than 5.5% Ni; no more than 5.25% Ni; no more than 5.0% Ni; or no more than 4.75% Ni.

Example steel alloys may include carbon. For instance, exemplary steel alloys may include, by weight, 0.11% to 0.17% carbon (C). In various implementations, exemplary steel alloys may include, by weight, 0.13% to 0.17% C; 0.13% to 0.16% C; 0.14% to 0.17% C; 0.13% to 0.15% C; 0.15% to 0.17% C; 0.11% to 0.15% C; or 0.14% to 0.16% C. In various implementations, exemplary steel alloys may include, by weight, at least 0.11% C; at least 0.13% C; or at least 0.15% C. In various implementations, exemplary steel alloys may include, by weight, no more than 0.17% C; no more than 0.15% C; or no more than 0.13% C.

Example steel alloys may include titanium. For instance, exemplary steel alloys may include, by weight, 0.01% to 0.31% titanium (Ti). In various implementations, exemplary steel alloys may include, by weight, 0.01% to 0.28% Ti; 0.04% to 0.31% Ti; 0.01% to 0.15% Ti; 0.02% to 0.14% Ti; 0.15% to 0.31% Ti; 0.01% to 0.1% Ti; 0.1% to 0.2% Ti; 0.2% to 0.31% Ti; 0.07% to 0.18% Ti; 0.13% to 0.22% Ti; 0.18% to 0.26% Ti; 0.01% to 0.06% Ti; 0.06% to 0.11% Ti; 0.11% to 0.16% Ti; 0.16% to 0.21% Ti; 0.21% to 0.26% Ti; or 0.26% to 0.31% Ti. In various implementations, exemplary steel alloys may include, by weight, at least 0.01% Ti; at least 0.02% Ti; at least 0.10% Ti; at least 0.15% Ti; at least 0.20% Ti; or at least 0.25% Ti. In various implementations, exemplary steel alloys may include, by weight, no more than 0.31% Ti; no more than 0.25% Ti; no more than 0.20% Ti; no more than 0.15% Ti; no more than 0.10% Ti; or no more than 0.05% Ti.

In some instances, example steel alloys may include vanadium. For instance, exemplary steel alloys may include, when present, by weight, 0.01% to 0.21% vanadium (V). In various implementations, exemplary steel alloys may include, by weight, 0.01% to 0.18% V; 0.04% to 0.21% V; 0.01% to 0.11% V; 0.11% to 0.21% V; 0.01% to 0.07% V; 0.07% to 0.14% V; 0.14% to 0.21% V; 0.06% to 0.10% V; 0.10% to 0.14% V; 0.14% to 0.18% V; 0.01% to 0.04% V; 0.04% to 0.07% V; 0.07% to 0.10% V; 0.10% to 0.13% V; 0.13% to 0.16% V; or 0.16% to 0.19% V. In various implementations, exemplary steel alloys may include at least 0.01% V; at least 0.05% V; at least 0.10% V; or at least 0.15% V. In various implementations, exemplary steel alloys may include no more than 0.21% V; no more than 0.15% V; no more than 0.10% V; or no more than 0.05% V.

In some instances, example steel alloys may include tungsten. For instance, exemplary steel alloys may include, when present, by weight, 0.4% to 0.6% tungsten (W). In various implementations, exemplary steel alloys may include, by weight, 0.4% to 0.5% W; 0.5% to 0.6% W; 0.4% to 0.45% W; 0.45% to 0.5% W; 0.5% to 0.55% W; 0.55% to 0.6% W; 0.42% to 0.46% W; 0.48% to 0.52% W; 0.52% to 0.56% W; 0.40% to 0.43% W; 0.43% to 0.46% W; 0.46% to 0.49% W; 0.49% to 0.52% W; 0.52% to 0.55% W; 0.55% to 0.58% W; or 0.58% to 0.6% W. In various implementations, exemplary steel alloys may include at least 0.4% W; at least 0.45% W; at least 0.5% W; or at least 0.55% W. In various implementations, exemplary steel alloys may include no more than 0.6% W; no more than 0.55% W; no more than 0.5% W; or no more than 0.45% W.

In some instances, example steel alloys may include molybdenum. For instance, exemplary steel alloys may include, when present, by weight, 0.4% to 0.6% molybdenum (Mo). In various implementations, exemplary steel alloys may include, by weight, 0.4% to 0.5% Mo; 0.5% to 0.6% Mo; 0.4% to 0.45% Mo; 0.45% to 0.5% Mo; 0.5% to 0.55% Mo; 0.55% to 0.6% Mo; 0.42% to 0.46% Mo; 0.48% to 0.52% Mo; 0.52% to 0.56% Mo; 0.40% to 0.43% Mo; 0.43% to 0.46% Mo; 0.46% to 0.49% Mo; 0.49% to 0.52% Mo; 0.52% to 0.55% Mo; 0.55% to 0.58% Mo; or 0.58% to 0.6% Mo. In various implementations, exemplary steel alloys may include at least 0.4% Mo; at least 0.45% Mo; at least 0.5% Mo; or at least 0.55% Mo. In various implementations, exemplary steel alloys may include no more than 0.6% Mo; no more than 0.55% Mo; no more than 0.5% Mo; or no more than 0.45% Mo.

In some instances, example steel alloys may include one or more incidental elements and/or impurities. Incidental elements and impurities in the disclosed steel alloys may include, but are not limited to, silicon, tantalum, copper, manganese, niobium, nitrogen, oxygen, phosphorous, and sulfur elements adhering to raw material stock, or mixtures thereof. Incidental elements and impurities may be present in the alloys disclosed herein in amounts totaling no more than 0.1 wt %, no more than 0.05 wt %, no more than 0.01 wt %, or no more than 0.001 wt %.

In some instances, example steel alloys may include, by weight, no more than 0.01% silicon; no more than 0.001% silicon; or no more than 0.0001% silicon.

In some instances, example steel alloys may include, by weight, no more than 0.01% tantalum; no more than 0.001% tantalum; or no more than 0.0001% tantalum.

In some instances, example steel alloys may include, by weight, no more than 0.01% copper; no more than 0.001% copper; or no more than 0.0001% copper.

In some instances, example steel alloys may include, by weight, no more than 0.1% manganese; no more than 0.01% manganese; or no more than 0.001% manganese.

In some instances, example steel alloys may include, by weight, no more than 0.01% niobium; no more than 0.005% niobium, or no more than 0.001% niobium.

In some instances, example steel alloys may include, by weight, no more than 0.02% nitrogen, no more than 0.01% nitrogen, no more than 0.005% nitrogen; or no more than 0.001% nitrogen.

In some instances, example steel alloys may include, by weight, no more than 0.04% oxygen, no more than 0.02% oxygen; no more than 0.01% oxygen; no more than 0.005% oxygen; or no more than 0.001% oxygen.

In some instances, example steel alloys may include, by weight, no more than 0.01% phosphorous; no more than 0.005% phosphorous, or no more than 0.001% phosphorous.

In some instances, example steel alloys may include, by weight, no more than 0.01% sulfur; no more than 0.005% sulfur, or no more than 0.001% sulfur.

It is understood that the alloys described herein may consist only of the above-mentioned constituents, may consist essentially of such constituents, or, in other embodiments, may include additional constituents.

Example steel alloys may have a ratio of chromium to nickel, by weight, between 2.4 and 3.3. In various instances, example steel alloys may have a ratio of chromium to nickel, by weight, between 2.4 and 2.9; between 2.6 and 3.3; between 2.7 and 2.9; between 2.75 and 2.85; or between 2.8 and 2.9. In various instances, example steel alloys may have a ratio of chromium to nickel, by weight, of no less than 2.4; no less than 2.6; no less than 2.8; no less than 3.0 or no less than 3.2. In various instances, example steel alloys may have a ratio of chromium to nickel, by weight, of no greater than 3.3; no greater than 3.1; no greater than 2.9; no greater than 2.7; or no greater than 2.5.

Example steel alloys may include components discussed above in various combinations of amounts. For instance, example steel alloys may include, by weight, 13.25% to 14.75% chromium; 4.5% to 5.5% nickel; 0.13% to 0.17% carbon; 0.01% to 0.31% titanium; 0.01% to 0.21% vanadium; 0.4% to 0.6% tungsten; 0.4% to 0.6% molybdenum; no more than 0.01% copper; no more than 0.01% manganese; no more than 0.01% niobium; no more than 0.02% nitrogen; no more than 0.04% oxygen, and the balance of weight percent comprising iron and incidental elements and impurities. In some instances, example steel alloys may include, by weight, 13.75% to 14.25% chromium; 4.75% to 5.25% nickel; 0.14 to 0.16% carbon; 0.10% to 0.20% titanium; 0.07% to 0.14% vanadium; 0.45% to 0.55% tungsten; and 0.45% to 0.55% molybdenum; no more than 0.01% manganese; no more than 0.01% niobium; no more than 0.02% nitrogen; no more than 0.04% oxygen, and the balance of weight percent comprising iron and incidental elements and impurities. In some instances, example steel alloys may include, by weight, 13.25% to 14.75% chromium; 4.5% to 5.5% nickel; 0.11% to 0.15% carbon; 0.02% to 0.14% titanium; no more than 0.01% copper; no more than 0.01% manganese; no more than 0.02% nitrogen; no more than 0.04% oxygen; and the balance of weight percent comprising iron and incidental elements and impurities. Other amounts are contemplated.

B. Example Phase and Microstructure Characteristics

Exemplary alloys can have various phase and microstructure characteristics in powder form, after being subjected to an additive manufacturing process (also referred to as "as-built"), and after Stage I tempering.

Stage I tempering can involve placing a printed article in a heated environment for a predetermined period of time. For instance, Stage I tempering may be performed at 100° C. to 250° C. for 30 minutes to 4 hours. As an example, Stage I tempering may be performed at 200° C. for 1 hour.

In some instances, after being subjected to an additive manufacturing process exemplary alloys can have a majority martensitic structure. Exemplary alloys can also include minor amounts of δ-ferrite and γ-austenite.

Exemplary alloys, after being subjected to an additive manufacturing process can have a microstructure that is more than 60% (phase fraction) martensite; more than 65% martensite; more than 70% martensite; more than 95% martensite; more than 98% martensite; or about 99% martensite. In various instances, exemplary alloys, after being subjected to an additive manufacturing process, can have a microstructure that is 60% to 72% martensite; 60% to 66% martensite; or 66% to 72% martensite.

Exemplary alloys, after being subjected to an additive manufacturing process, can have a microstructure that is less than 20% (phase fraction) δ-ferrite; less than 18% δ-ferrite; less than 16% δ-ferrite; less than 14% δ-ferrite; less than 12% δ-ferrite; or less than 1% δ-ferrite.

Exemplary alloys, after being subjected to an additive manufacturing process, can have a microstructure that is less than 30% (phase fraction) γ-austenite; less than 25% γ-austenite; less than 20% γ-austenite; less than 18% γ-austenite; or less than 1% γ-austenite.

Example alloys after being subjected to an additive manufacturing process, can have a microstructure that is less than 40% (phase fraction) δ-ferrite and γ-austenite; less than 30% δ-ferrite and γ-austenite; less than 20% δ-ferrite and γ-austenite; less than 5% δ-ferrite and γ-austenite; or less than 2% δ-ferrite and γ-austenite.

Exemplary alloys, after being subjected to an additive manufacturing process and/or after Stage I tempering, which may be performed at 200° C. for 1 hour, can have a microstructure that includes $Fe_{2.4}C$ particles (also referred to as ε-carbides).

C. Example Mechanical Properties

Exemplary alloys can have various mechanical properties in powder form, after being subjected to an additive manufacturing process (also referred to as "as-built"), and after Stage I tempering. Various mechanical properties below are described in terms of x-y specimens, where the long axis of tensile specimens was parallel to the build plate, and z-specimens, where the long axis of tensile specimens was perpendicular to the build plate and tested in tension.

Example alloys can have various yield strength properties in as-built form, which means after being subjected to an additive manufacturing process and without performing any aging or solution heat treatment.

For instance, exemplary alloys in as-built form can have a yield strength, 0.2% elastic offset, for z-specimens, of 1030 MPa to 1470 MPa. In various implementations, exemplary alloys in as-built form can have a yield strength for z-specimens, of 1030 MPa to 1045 MPa; 1033 Mpa to 1041 MPa; 1400 MPa to 1470 MPa; 1400 MPa to 1435 MPa; 1435 MPa to 1470 MPa; 1440 MPa to 1460 MPa; or 1445 MPa to 1465 MPa. In various implementations, exemplary alloys in as-built form can have a yield strength for z-specimens, of at least 1030 MPa; at least 1037 MPa; at least 1400 MPa; at least 1430 MPa; at least 1445 MPa; at least 1455 MPa; or at least 1460 MPa. In various implementations, exemplary alloys in as-built form can have a yield strength, for z-specimens, of no greater than 1460 MPa; no greater than 1455 MPa; no greater than 1445 MPa; no greater than 1435 MPa; no greater than 1420 MPa; or no greater than 1400 MPa.

Exemplary alloys in as-built form can have a yield strength, 0.2% elastic offset, for x-y-specimens, of 950 MPa to 1140 MPa. In various implementations, exemplary alloys in as-built form can have a yield strength, for x-y-specimens, of 950 MPa to 1000 MPa; 1000 MPa to 1050 MPa; 960 MPa to 1040 MPa; 1120 MPa to 1140 MPa; 1125 MPa to 1135 MPa; or 1130 MPa to 1134 MPa. In various implementations, exemplary alloys in as-built form can have a yield strength, for x-y specimens, of at least 950 MPa; at least 970 MPa; at least 990 MPa; at least 1010 MPa; at least 1030 MPa; at least 1045 MPa; at least 1125 MPa; or at least 1130 MPa. In various implementations, exemplary alloys in as-built form can have a yield strength, for x-y specimens, of no greater than 1135 MPa; no greater than 1133 MPa; no greater than 1040 MPa; no greater than 1020 MPa; no greater than 1000 MPa; no greater than 980 MPa; or no greater than 960 MPa.

Exemplary alloys in as-built form can have an elongation, for x-y-specimens, of 11% to 21%. In various implementations, exemplary alloys in as-built form can have an elongation, for x-y specimens, of 11% to 21%; 11% to 15%; 15% to 18%; 18% to 21%; 15% to 17%; 17% to 19%; or 19% to 21%. In various implementations, exemplary alloys in as-built form can have an elongation, for x-y specimens of at least 11%; at least 15%; at least 17%; at least 19%; or at least 20%. In various implementations, exemplary alloys in as-built form can have an elongation, for x-y specimens, of no greater than 20%; no greater than 18%; no greater than 16%; or no greater than 12%.

Exemplary alloys in as-built form can have a hardness value of 44 HRC to 50 HRC. In various implementations, exemplary alloys in as-built form can have a hardness of 44 HRC to 47 HRC; 47 HRC to 50 HRC; 44 HRC to 46 HRC; 46 HRC to 48 HRC; or 48 HRC to 50 HRC. In various implementations, exemplary alloys in as-built form can have a hardness of at least 44 HRC; at least 46 HRC; or at least 48 HRC. In various implementations, exemplary alloys in as-built form can have a hardness of no greater than 49 HRC; no greater than 47 HRC; or no greater than 45 HRC.

Exemplary alloys in as-built form can have an ambient toughness ($K_{IC}$) between 185 and 235. In various implementations, exemplary alloys in as-built form can have an ambient toughness ($K_{IC}$) between 185 and 235; between 185 and 195; between 225 and 235; between 190 and 230; between 190 and 210; or between 210 and 230. In various implementations, exemplary alloys in as-built form can have an ambient toughness ($K_{IC}$) of at least 185; at least 190; at least 195; at least 200; at least 205; at least 210; at least 215; at least 220; at least 225; or at least 230. In various implementations, exemplary alloys in as-built form can have an ambient toughness ($K_{IC}$) of no greater than 235; no greater than 230; no greater than 225; no greater than 220; no greater than 215; no greater than 210; no greater than 205; no greater than 200; no greater than 195; or no greater than 190.

Exemplary alloys in as-built form can have a pitting potential greater than 0 mV SCE. In various instances, exemplary alloys in as-built form can have a pitting potential no less than 0 mV SCE; no less than 5 mV SCE; no less than 10 mV SCE; no less than 15 mV SCE; no less than 20 mV SCE; no less than 25 mV SCE; or no less than 30 mV SCE.

II. Example Methods of Preparing Alloy Powders

Example steel alloys disclosed and contemplated herein may be fabricated into various input stock forms relevant to the additive manufacturing system of interest. For instance, example steel alloys disclosed and contemplated herein may be manufactured into atomized alloy powder using available atomization techniques such as inert gas atomization. Resulting atomized alloy powders may be used in powder-bed fusion and directed energy deposition systems.

An example method of manufacturing an atomized alloy powder includes melting elemental metal feedstock or pre-alloyed feedstock such that a desired chemistry is produced. In some combinations of elements disclosed above, when a desired chemistry reaches temperatures at or above temperatures where there is no solid material fraction in the melt, atomization processes should take place.

Example atomized alloy powders can have particles sized for a particular use and/or fabrication system. In some implementations, example atomized alloy powders include particles having diameters of from 15 µm to 45 µm.

III. Example Methods of Manufacture

Example steel alloys disclosed and contemplated herein may be used in additive manufacturing systems. Additive manufacturing is a process by which products are built in a layered fashion by selectively fusing metal using a computer-controlled energy source (e.g., laser, electron beam, weld torch, or the like). Additive manufacturing is also defined in ASTM F2792-12a entitled "Standard Terminology for Additively Manufacturing Technologies."

Example additive layer manufacturing processes include: direct metal laser sintering (DMLS) in which a laser is used to sinter a powder media in precisely controlled locations; laser wire deposition in which a wire feedstock is melted by a laser and then deposited and solidified in precise locations to build the product; electron beam melting; laser engineered net shaping; and direct metal deposition. In general, additive manufacturing techniques provide flexibility in free-form fabrication without geometric constraints, fast material processing time, and innovative joining techniques. Suitable additive manufacturing systems include the EOSINT M 280 Direct Metal Laser Sintering (DMLS) additive manufacturing system, available from EOS GmbH (Robert-Stirling-Ring 1, 82152 Krailling/Munich, Germany).

In some implementations, direct metal laser sintering (DMLS) is used to produce articles comprising the disclosed and contemplated example steel alloys. During example processes, an atomized alloy powder may be spread in a bed and a laser is used to selectively melt and fuse regions of the bed. Articles of manufacture may be built in a layer-by-layer fashion by continually spreading and fusing layers of powder.

In some implementations, exemplary methods may comprise pre-heating a build plate of an additive manufacturing system. In some instances, a build plate may be preheated to about 40° C. In some instances, a build plate may be preheated to about 175° C. to about 200° C.; 180° C. to 190° C.; 190° C. to 200° C.; 180° C. to 185° C.; 185° C. to 190° C.; 190° C. to 195° C.; 195° C. to 200° C.; 178° C. to 182° C.; 179° C. to 181° C.; 180° C. to 182° C.; or about 180° C. In various instances, a build plate may be preheated to no less than 175° C.; no less than 180° C.; no less than 185° C.; no less than 190° C.; or no less than 195° C. In various instance, a build plate may be preheated to no greater than 200° C.; no greater than 195° C.; no greater than 190° C.; no greater than 185° C.; or no greater than 180° C.

In some instances, articles may be ready for use after additive manufacturing. In some instances, various post-processing operations may be performed after the build process. For example, an as-built article of manufacture may be subjected to basic heat treatment for stress relief. As an example, an as-built article of manufacture may be subjected to Stage I tempering, which may include the article being in a 200° C. environment for up to 1 hour. As an example, an as-built article of manufacture may be placed in an environment at 300° C. to 700° C. for 1 hour to 4 hours.

Typically, solution heat treatment and aging are commonly used for precipitation-hardened martensitic stainless steel grades ("PH steel grades"), which include 17-4PH and 15-5PH as examples. Various instantly disclosed example alloys typically do not undergo solution heat treatment and aging, which may result in time and cost savings.

Example methods of using an atomized alloy powder in additive manufacturing may include various operations. For instance, an example method may include receiving an atomized alloy powder comprising alloyed particles. The alloyed particles may comprise components in amounts as described in greater detail above. The method can also include conducting additive manufacturing with the atomized alloy powder to generate a manufactured article. In some instances, the additive manufacturing may be performed under an argon (Ar) atmosphere. Then a manufactured article may be removed from the additive manufacturing system. In some instances, as discussed above, the manufactured article may be subjected to one or more post-processing operations, such as heat treatment and tempering.

IV. Experimental Examples

Various experimental example alloys were fabricated and the results are discussed below. In some instances, experimental example alloys were evaluated in comparison to commercially-available alloys.

As an experimental example, an Ar-atomized 100-kg powder heat was obtained (Example Alloy 1). Specified target composition ranges and measured powder chemistries are provided in Table 1 below for Example Alloy 1 and Example Alloy 2.

TABLE 1

Target composition, specified production ranges, and measured powder chemistries for manufactured example powder Example Alloy 1 and Example Alloy 2.

| Composition | Example Alloy 1 | | Example Alloy 2 | |
|---|---|---|---|---|
| | Target (production range), wt. % | Measured, wt. % | Target (production range), wt. % | Measured, wt. % |
| Cr | 14 (13.25-14.75) | 14 | 14 (13.25-14.75) | 13.77 |
| Ni | 5.0 (4.5-5.5) | 4.9 | 5.0 (4.5-5.5) | 5.1 |
| C | 0.15 (0.13-0.17) | 0.13 | 0.13 (0.11-0.15) | 0.13 |
| Ti | 0.15 (0.01-0.31) | 0.13 | 0.08 (0.02-0.14) | 0.03 |
| Mo | 0.5 (0.4-0.6) | 0.4 | | |
| V | 0.10 (0.01-0.21) | 0.09 | | |
| W | 0.5 (0.4-0.6) | 0.4 | | |
| Nb | <0.1 | 0.0 | <0.1 | 0.0 |
| N | <0.02 | 0.01 | <0.02 | 0.01 |
| O | <0.04 | 0.03 | <0.04 | 0.04 |
| Cr/Ni | 2.8 | 2.86 | 2.8 | 2.85 |

Various commercially available alloys were tested: Supplier A atomized under an argon atmosphere (Supplier A (Ar)), Supplier B atomized under an argon atmosphere (Supplier B (Ar)), Supplier C, which is a blend of 50% Supplier C alloy atomized under an argon atmosphere with 50% Supplier C alloy atomized under a nitrogen atmosphere (Supplier C (Ar/N$_2$)), and Supplier C atomized under a nitrogen atmosphere (Supplier C N$_2$). Elemental compositions of each are provided in Table 2, below.

TABLE 2

Elemental compositions, in weight percent (wt. %), of commercially available alloys.

| | Fe | Cr | Ni | Mo | Nb + Ta | C | N | Cu | Mn | Si |
|---|---|---|---|---|---|---|---|---|---|---|
| Supplier A (Ar) | Balance | 15.6 | 4.7 | — | 0.22 | 0.01 | 0.036 | 3.61 | 0.5 | 0.38 |
| Supplier B (Ar) | Balance | 16.12 | 4.15 | — | 0.2 | 0.02 | 0.007 | 3.21 | 0.03 | 0.79 |
| Supplier C (Ar) | Balance | 16.7 | 4.29 | 0.05 | 0.27 | 0.01 | 0.031 | 4.49 | 0.20 | 0.36 |
| Supplier C (N2) | Balance | 15.5 | 4.55 | 0.26 | 0.24 | 0.05 | 0.099 | 4.5 | 0.7 | 0.76 |
| Supplier C (Ar) (2) | Balance | 15.6 | 4.03 | <0.01 | 0.33 | 0.01 | 0.01 | 3.89 | 0.24 | 0.29 |

The Example Alloy 1 powder was subjected to various flow behavior and particle size distribution and compared to commercially available powders. Results are shown in Table 3 below.

TABLE 3

Comparing Example Alloy 1 powder to commercially available powders.

| Material | Avalanche Angle | Hausner Ratio | Angle of Repose | Hall flow | % <15 μm | % porosity |
|---|---|---|---|---|---|---|
| Supplier A (Ar) | 22° | 1.10 | 32° | 19.3 | 0 | 0.27 (27) |
| Supplier B (Ar) | 28° | 1.06 | 30° | 21.5 | 0 | 0.33 (39) |
| Supplier C (Ar) | 37° | 1.21 | 40° | Did not flow | 0 | 1.44 (37) |
| Supplier C (N2) | 30° | 1.09 | 33° | 22.1 | 0 | 0.18 (19) |
| Example Alloy 1 | 29° | 1.11 | 33° | 18.8 | 0 | 0.14 (10) |

Metallurgy specimens from example alloy powders were characterized by optical and electron microscopy, X-ray diffraction and electron backscatter diffraction (EBSD). For Example Alloy 1, experimental coupons were fabricated on an EOS M290 machine (available from EOS North America, Novi, Michigan) on a build plate preheated at 40° C. The build process included bidirectional beam scanning with a scan rotation angle of 67°. All coupons were produced using the same build parameters (195W laser power, 750 mm/s scan speed, 0.1 mm hatch spacing and 40 μm layer thickness).

For Example Alloy 2, experimental coupons were fabricated on an EOS M290 machine (available from EOS North America, Novi, Michigan) on a build plate preheated at 180° C. The build process included bidirectional beam scanning with a scan rotation angle of 67°. All coupons were produced using the same build parameters (195W laser power, 750 mm/s scan speed, 0.1 mm hatch spacing and 40 μm layer thickness).

Figure 1B:
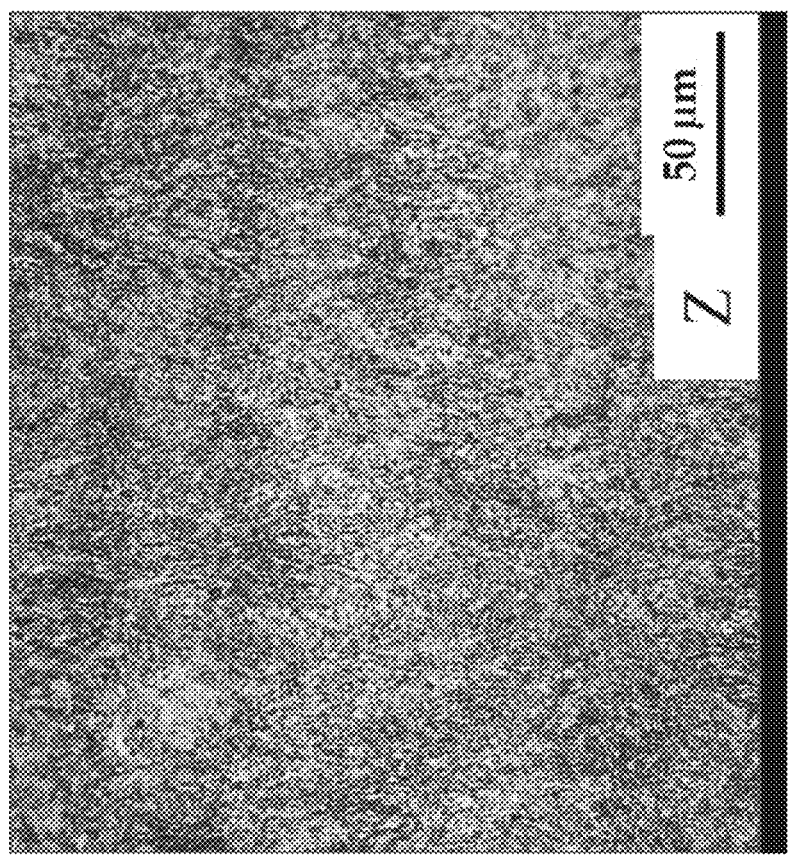
FIG. 1B is an optical micrograph of the experimental Example Alloy 1 shown in FIG. 1A, taken perpendicular to the build plate (a z specimen).

As-built, optical micrographs were obtained and are shown in FIG. 1A (x-y specimen, parallel to the build plate) and FIG. 1B (z specimen, perpendicular to the build plate). As shown in FIG. 1A and FIG. 1B, the Example Alloy 1 has a primarily martensitic microstructure.

Figure 2:
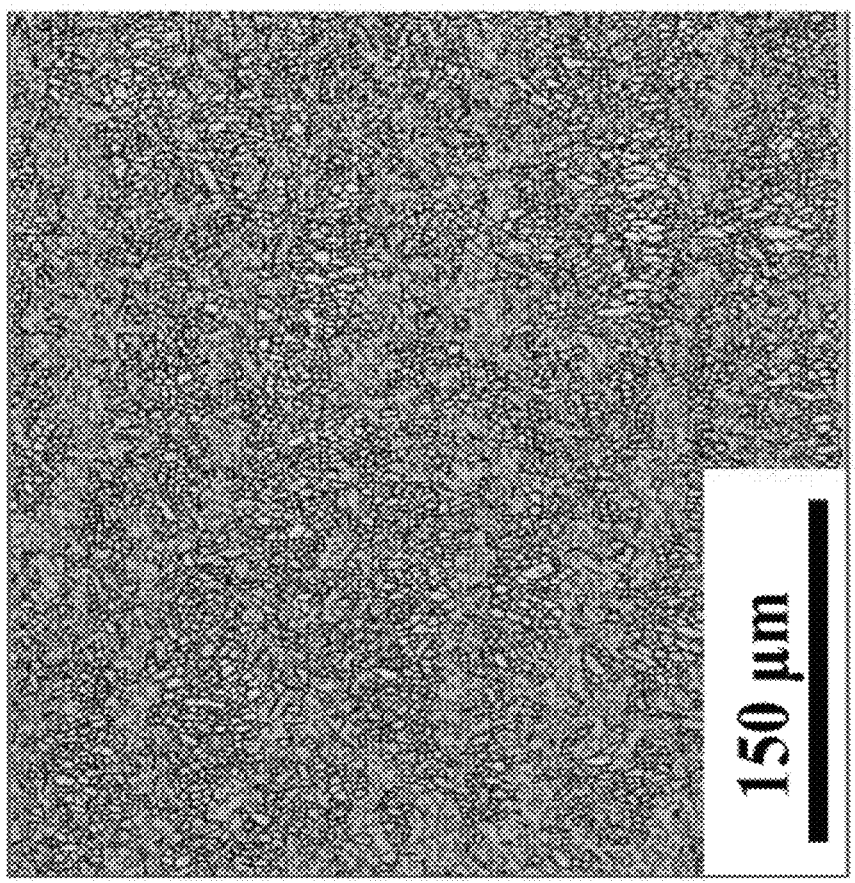
FIG. 2 is an electron backscatter diffraction (EBSD) image of the experimental Example Alloy 1 shown in FIG. 1A and FIG. 1B.
Figure 3:
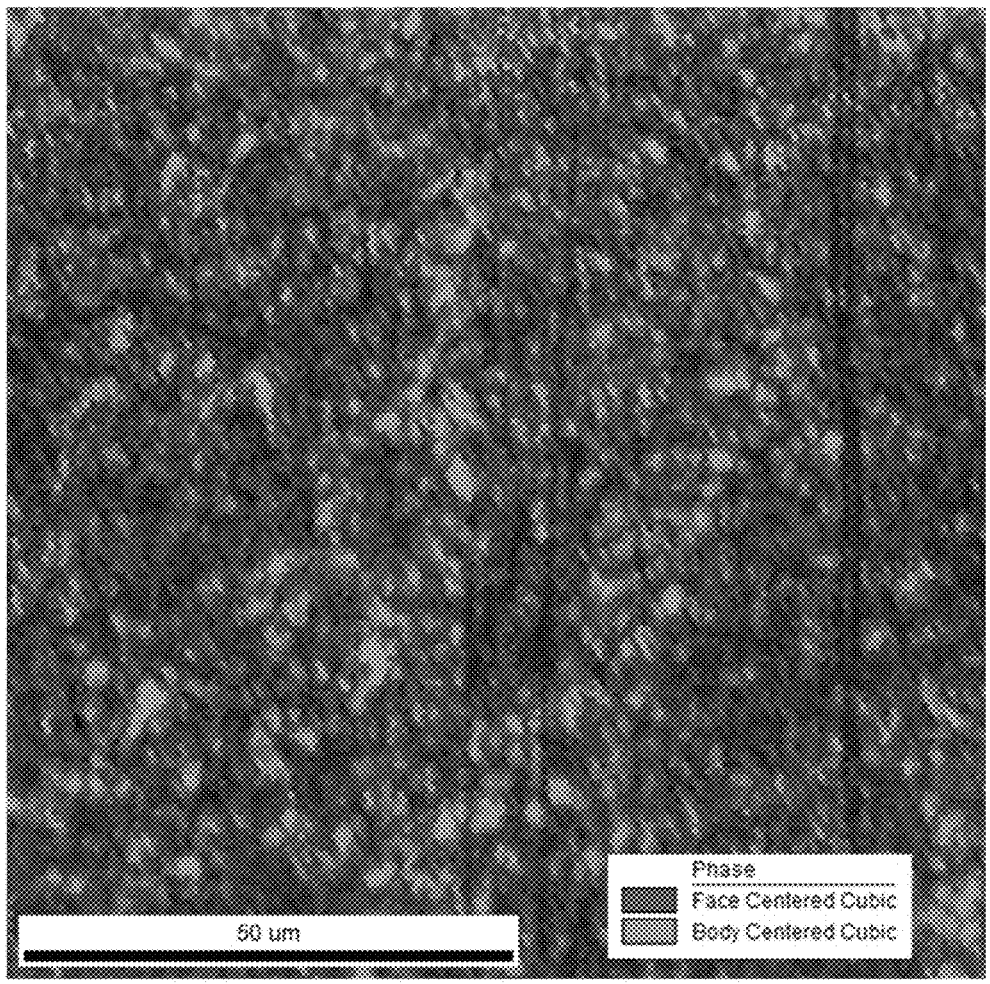
FIG. 3 is an electron backscatter diffraction (EBSD) image of experimental Example Alloy 2.

EBSD image quality maps were used to identify and quantify the ferrite (yellow), martensite (blue) and austenite (red) phases using the methods outlined in Vunnam, Swathi, Abhinav Saboo, Chantal Sudbrack, and Thomas L. Starr. "Effect of powder chemical composition on the as-built microstructure of 17-4 PH stainless steel processed by selective laser melting." *Additive Manufacturing* 30 (2019): 100876. FIG. 2 shows an EBSD image used in phase analysis of Example Alloy 1. FIG. 3 shows an EBSD image used in phase analysis of Example Alloy 2. As shown in FIG. 3, for Example Alloy 2 ferrite was not visible (less than 1%), austenite (red) was not visible, and 99% is martensite.

Table 4 below shows the overall phase fractions of the as-built Example Alloy 1 and as-built Example Alloy 2.

TABLE 4

Overall phase fractions of the as-built Example Alloy 1 and commercial powders shown in Table 1.

| Alloy | δ-ferrite (phase fraction, %) | Austenite (phase fraction, %) | Martensite (phase fraction, %) |
|---|---|---|---|
| Example Alloy 1 | 11 | 17 | 72 |
| Example Alloy 2 | <1 | <1 | 99 |
| Supplier A (Ar) | 20 | 3.7 | 75 |
| Supplier B (Ar) | 95 | <1% | 5 |

Tensile and hardness testing for Example Alloy 1 and Example Alloy 2 were also performed and the results are shown in Table 5 and Table 6 below. Coupons fabricated from Ar-atomized powders were subjected to two heat treatments: (1) solutionize and H900 (where "H900" is heat treatment at 482° C. (900° F.) for 1 hour) and (2) direct H900 harden without solutionizing. Only commercial powders were heat treated—the Example Alloy 1 and Example Alloy 2 samples did not undergo any post-processing treatment.

Using wire EDM, flat "dog bone" test specimens were cut from as-built and heat-treated coupons. A bar of commercially available wrought 17-4 PH was procured for use as a baseline. As received, the wrought material was already solutionized (condition A). The long axis of tensile specimens were either parallel to the build plate (XY) or perpendicular to the build plate (Z) and tested in tension. Three tests were performed for each combination of powder and heat treatment. Hardness was measured using a Wilson Instruments Rockwell 500 Hardness Tester.

As shown in Table 5 and Table 6, the as-built properties for both Example Alloy 1 and Example Alloy 2 exceed as-built properties from commercially available 17-4PH powder. As shown in Table 5 and Table 6, the as-built properties for both Example Alloy 1 and Example Alloy 2 are at par with the ultimate tensile strength properties for aged (h900) commercially available powders.

TABLE 5

Tensile properties for Example Alloy 1 (Z specimen), Example Alloy 2 (Z specimen), wrought commercially available alloy (17-4PH), and a commercially available alloy (Supplier A (Ar), Z specimen).

| Condition | Sample | Yield strength, 0.2% elastic offset (MPa) | Ultimate tensile strength (MPa) | Total elongation (%) |
|---|---|---|---|---|
| As-built | Example Alloy 1 | 1457.5 ± 11.5 | 1711 ± 19 | 11.5 ± 0.7 |
| As-built (180° C. pre-heated build plate) | Example Alloy 2 | 1038 | 1540 | 12 |
| Solutionized | Wrought 17-4PH | 841 ± 13 | 1080 ± 13 | 13.1 ± 1.1 |
| Solutionized and hardened | Wrought 17-4PH | 1371 ± 52 | 1523 ± 18 | 17.3 ± 1.2 |

TABLE 5-continued

Tensile properties for Example Alloy 1 (Z specimen), Example Alloy 2 (Z specimen), wrought commercially available alloy (17-4PH), and a commercially available alloy (Supplier A (Ar), Z specimen).

| Condition | Sample | Yield strength, 0.2% elastic offset (MPa) | Ultimate tensile strength (MPa) | Total elongation (%) |
|---|---|---|---|---|
| As-built | Supplier A (Ar) | 856 ± 23 | 917 ± 27 | 11 ± 0.6 |
| Hardened | Supplier A (Ar) | 138 ± 947 | 1467 ± 11 | 9.4 ± 1 |
| Solutionized and hardened | Supplier A (Ar) | 1322 ± 2 | 1401 ± 9 | 10 ± 0.5 |

TABLE 6

Tensile properties for Example Alloy 1 (XY specimen), Example Alloy 2 (XY specimen), wrought commercially available alloy (17-4PH), and a commercially available alloy (Supplier A (Ar), XY specimen).

| Condition | Sample | Yield strength, 0.2% elastic offset (MPa) | Ultimate tensile strength (MPa) | Total elongation (%) | Hardness (HRC) |
|---|---|---|---|---|---|
| As-built | Example Alloy 1 | 1004 ± 40 | 1498 ± 48 | 20.6 ± 0.2 | 47.6 |
| Stage 1 temper (200° C./1 h) | Example Alloy 1 | | | | 46 |
| As-built (180° C. pre-heated build plate) | Example Alloy 2 | 1132 | 1480 | 12 | |
| Solutionized | Wrought 17-4PH | 841 ± 13 | 1080 ± 13 | 13.1 ± 1.1 | |
| Solutionized and hardened | Wrought 17-4PH | 1371 ± 52 | 1523 ± 18 | 17.3 ± 1.2 | 48.2 |
| As-built | Supplier A (Ar) | 910 ± 8 | 1084 ± 13 | 15.3 ± 0.8 | 34.5 |
| Hardened (H900) | Supplier A (Ar) | 1263 ± 40 | 1467 ± 11 | 9.4 ± 1 | 46.8 |
| Solutionized and hardened | Supplier A (Ar) | 1335 ± 36 | 1425 ± 40 | 10.7 ± 1.4 | 45.1 |

Figure 4:
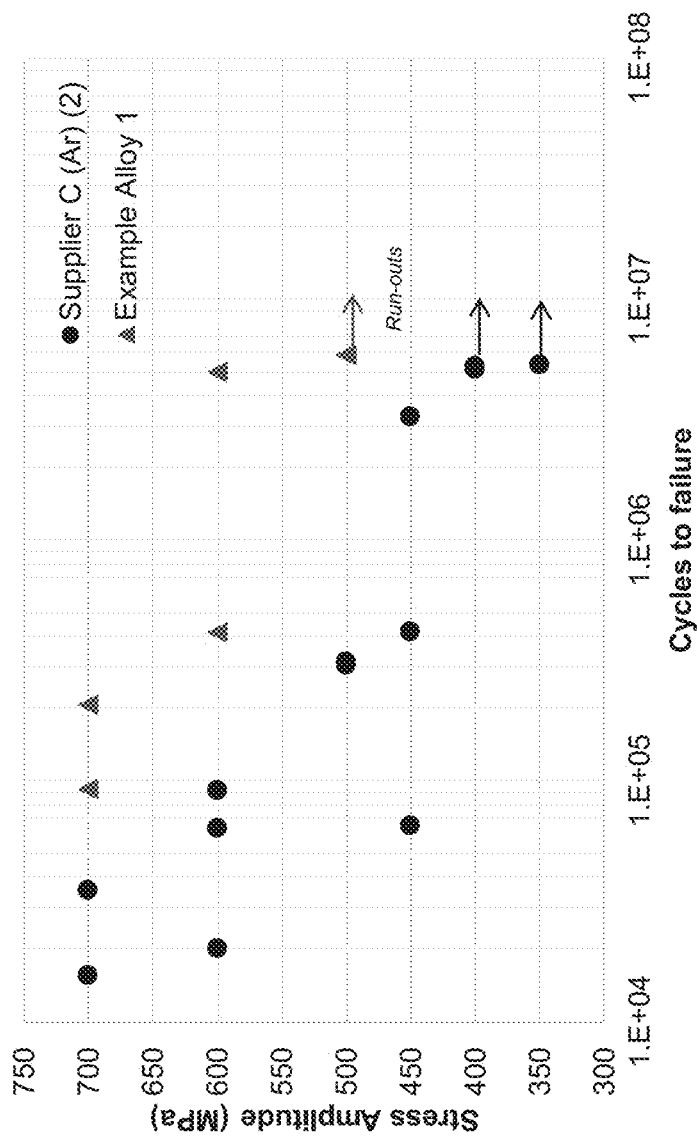
FIG. 4 shows a graph comparing fatigue performance of a commercially available alloy to the experimental Example Alloy 1 shown in FIG. 1A, FIG. 1B, and FIG. 2.

Fatigue performance of a Supplier C (Ar) (2)(15.6 wt % Cr, 4.03 wt % Ni, 0 wt % Mo, 0.33 wt % Nb+Ta, 0.01 wt % C, 0.01 wt % N, 3.89 wt % Cu, 0.24 wt % Mn, and 0.29 wt % Si, balance Fe) was compared to the Example Alloy 1. ASTM E466-15 (2015) was used to test fatigue performance, where testing conditions had R=−1 (tested in fully reversible tension-compression state) and 10 Hz. Results of the as-built alloys are shown in FIG. 4 and indicate that the Example Alloy 1 shows better fatigue performance at all stress amplitudes, and a higher fatigue limit at $10^7$ cycles compared to the Supplier C (Ar) (2) alloy.

Figure 5:
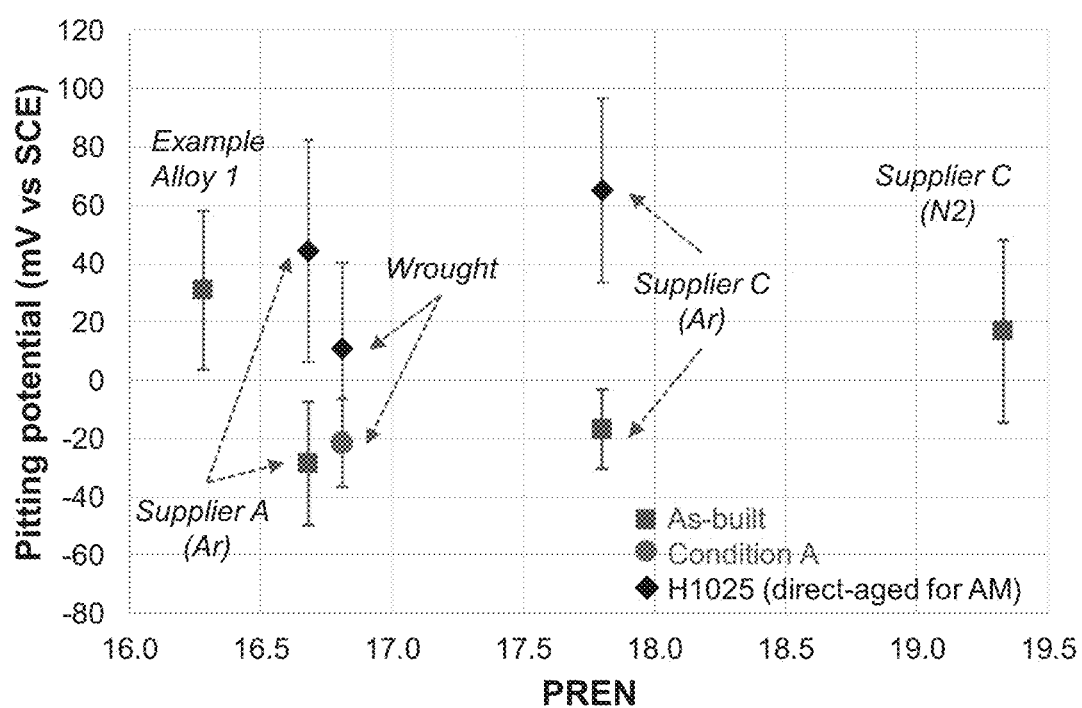
FIG. 5 shows a graph comparing corrosion performance of commercially available alloys to the experimental Example Alloy 1 shown in FIG. 1A, FIG. 1B, and FIG. 2.

Corrosion tests were performed using potentiodynamic scans conducted using 3.5% NaCl solution and a 0.5 mV/s scan rate. Results, averaged over five scans, are shown in FIG. 5 and Table 7 (below), along with various commercial powders listed in Table 2, above. Results in FIG. 5 indicate that Example Alloy 1 has a relatively higher pitting potential as compared to the tested commercially available alloys.

TABLE 7

Corrosion properties (Pitting Potential measured using Potentiodynamic Scans; ASTM-G91) for Example Alloy 1 and compared with commercial powders.

| Alloy | Condition | Pitting Potential (mV SCE) |
|---|---|---|
| Example Alloy 1 | As-built | 30.9 |
| Supplier A (Ar) | As-built | −28.5 |
| Supplier C (Ar) | As-built | −16.8 |

Threshold stress intensity for the onset of environmentally induced hydrogen stress cracking was also tested for Example Alloy 1, Example Alloy 2 and various commercial powders. Testing was performed using ASTM F1624-12 (2018) at an imposed potential of −1.1 V and −0.3 V (near open circuit potential (OCP)). Results are shown in Table 8. As shown in Table 8, both Example Alloy 1 and Example Alloy 2 show very high ambient toughness (or $K_{JC}$) as compared to commercial 17-4PH, with comparable KISCC values under a corrosive environment.

TABLE 8

K$_{I-EHE}$ (threshold stress intensity for the onset of environmentally induced hydrogen stress cracking) measured using ASTM F1624 at imposed potential of −1.1 V and −0.3 V (near OCP) for Example Alloy 1, Example Alloy 2 and compared with commercial powders.

| | | K$_{I-EHE}$ (threshold stress intensity) | | |
|---|---|---|---|---|
| Alloy | Condition | No Potential | Open Circuit Potential in 3.5% NaCl | −1.1 V in 3.5% NaCl |
| Example Alloy 1 | As-built | 230.1 | 44.1 | 22.6 |
| Example Alloy 2 | As-built | 190.1 | 88.85 | 24.1 |
| Supplier A (Ar) | As-built | 86.3 | | 28.4 |
| Supplier C (Ar) | As-built | 76.6 | 74.8 | 30 |
| Supplier C (N2) | As-built | 41.2 | 28.5 | 17.2 |

Figure 6:
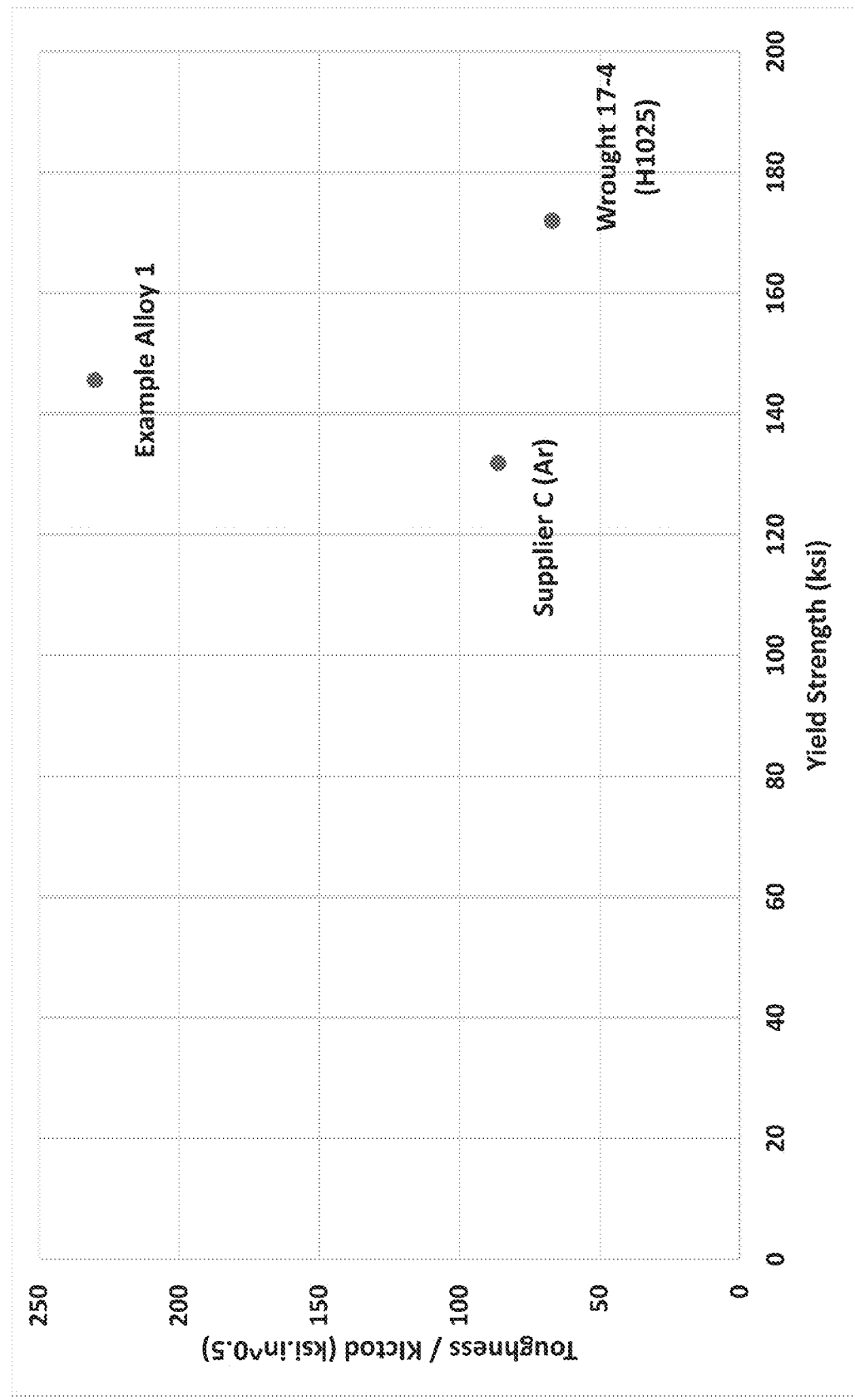
FIG. 6 shows a graph comparing ambient toughness and stress corrosion cracking (SCC) resistance performance of commercially available alloys to the experimental Example Alloy 1 shown in FIG. 1A, FIG. 1B, and FIG. 2.

FIG. 6 shows a graph comparing ambient toughness and stress corrosion cracking (SCC) resistance performance of commercially available alloys to the experimental example alloy 1. K$_{IC}$ (ambient toughness) testing was performed according to ASTM E399-22. KISCC testing was performed according to ASTM F1624-12 (2018).

Figure 7:
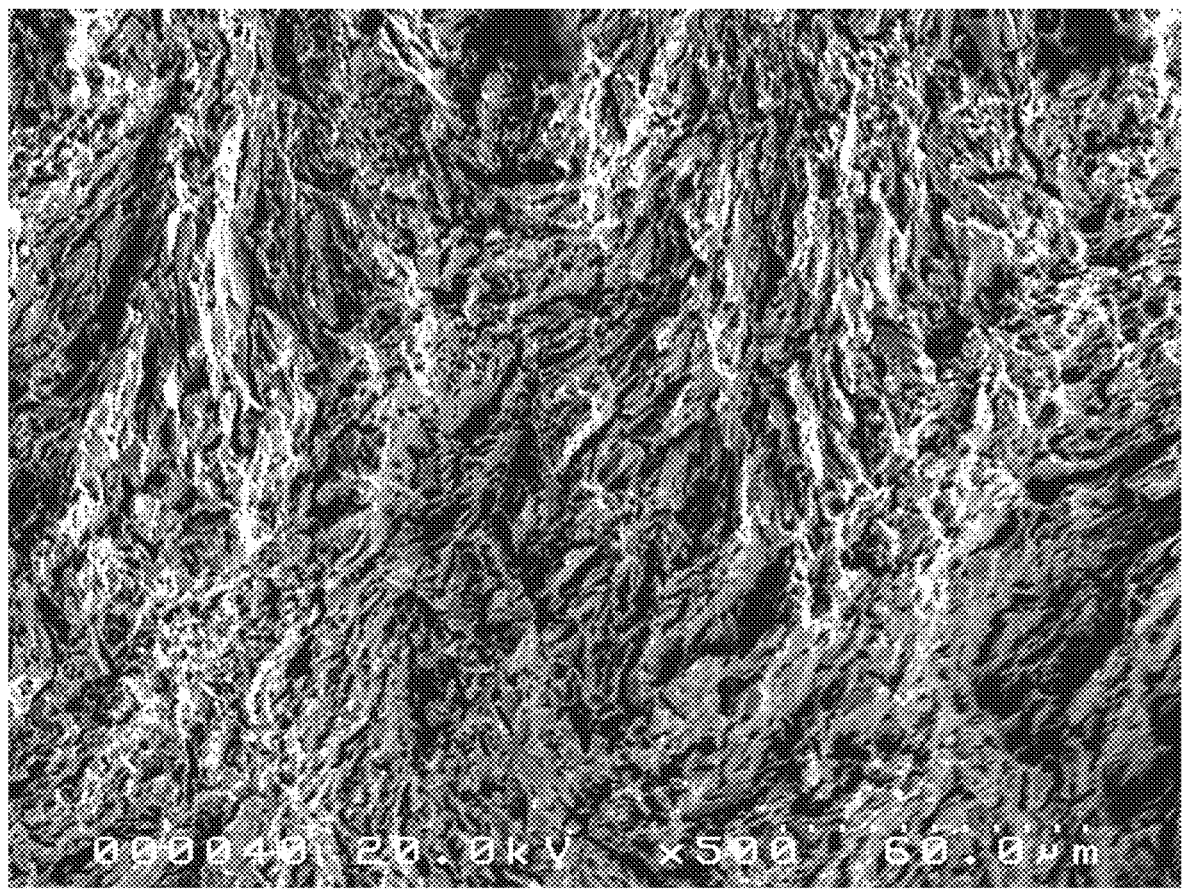
FIG. 7 is an optical micrograph of the experimental Example Alloy 1 shown in FIG. 6.
Figure 8:
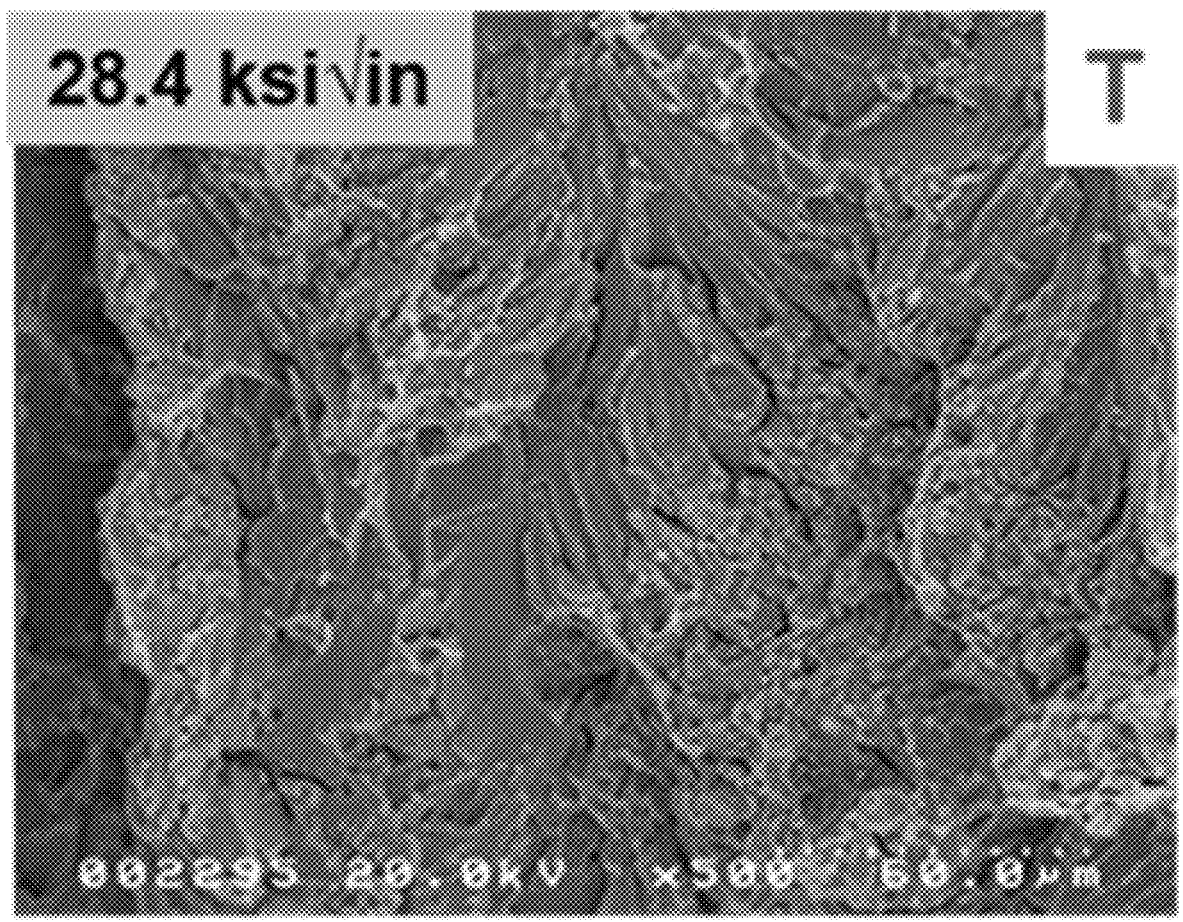
FIG. 8 is an optical micrograph of the experimental Supplier C (Ar) shown in FIG. 6.
Figure 9:
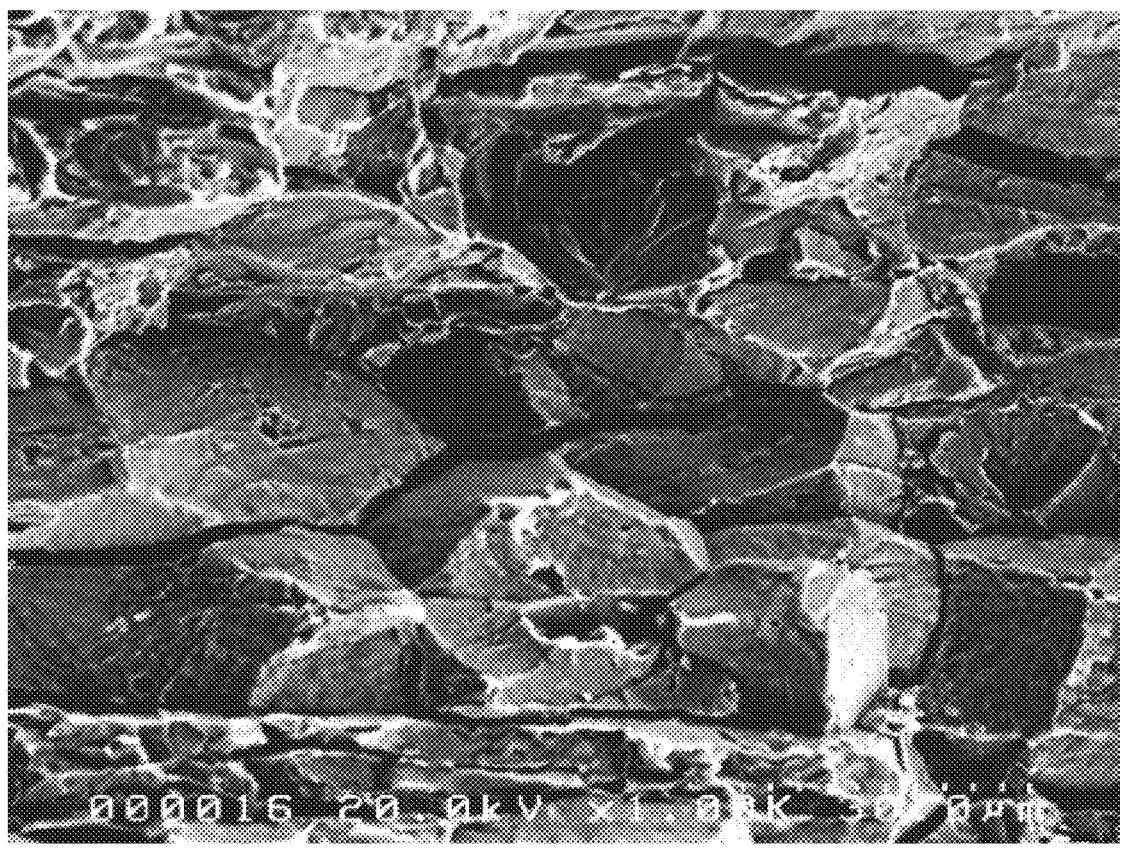
FIG. 9 is an optical micrograph of the experimental Wrought 17-4 (H1026) shown in FIG. 6.

FIG. 7 is an optical micrograph of the experimental Example Alloy 1 shown in FIG. 6, and quasi-cleavage is visible from the micrograph. FIG. 8 is an optical micrograph of the experimental Supplier C (Ar) shown in FIG. 6, and transgranular cleavage is visible from the micrograph. FIG. 9 is an optical micrograph of the experimental Wrought 17-4 (H1026) shown in FIG. 6, and intergranular cleavage is visible from the micrograph. Crack planes in FIG. 7, FIG. 8, and FIG. 9 are parallel to the build direction (the z-direction).

As shown in FIG. 6, FIG. 7, FIG. 8, and FIG. 9, Example Alloy 1 has improved toughness while maintaining comparable strength levels to both Supplier C (Ar) and Wrought 17-4 (H1025). Example Alloy 1 has comparable K$_{ISCC}$ values and preferred (quasi-cleavage) failure mode. Example Alloy 1 also shows enhanced resistance to intergranular embrittlement.

For the recitation of numeric ranges herein, each intervening number there between with the same degree of precision is contemplated. For example, for the range of 6-9, the numbers 7 and 8 are contemplated in addition to 6 and 9, and for the range 6.0-7.0, the numbers 6.0, 6.1, 6.2, 6.3, 6.4, 6.5, 6.6, 6.7, 6.8, 6.9, and 7.0 are contemplated. For another example, when a pressure range is described as being between ambient pressure and another pressure, a pressure that is ambient pressure is expressly contemplated.

It is understood that the foregoing detailed description and accompanying examples are merely illustrative and are not to be taken as limitations upon the scope of the disclosure. Various changes and modifications to the disclosed embodiments will be apparent to those skilled in the art. Such changes and modifications, including without limitation those relating to the chemical structures, substituents, derivatives, intermediates, syntheses, compositions, formulations, or methods of use, may be made without departing from the spirit and scope of the disclosure.

What is claimed is:

1. An atomized alloy powder usable in additive manufacturing, the atomized alloy powder comprising:
   alloy particles comprising, by weight percentage:
   13.25% to 14.75% chromium;
   4.5% to 5.5% nickel;
   0.11% to 0.17% carbon;
   0.01% to 0.31% titanium;
   no more than 0.01% copper;
   no more than 0.01% manganese;
   no more than 0.02% nitrogen;
   no more than 0.04% oxygen;
   no more than 0.01% sulfur; and
   wherein the alloyed particles have a ratio of chromium to nickel, by weight, between 2.4 and 3.3,
   the balance of weight percent comprising iron and incidental elements and impurities, and
   having a microstructure that is less than 30% δ-ferrite and γ-austenite and is greater than 70% martensite.

2. The atomized alloy powder according to claim 1, wherein the alloy particles comprise, by weight percentage,
   13.75% to 14.25% chromium;
   4.75% to 5.25% nickel;
   0.12% to 0.14% carbon; and
   0.06% to 0.10% titanium
   no more than 0.01% niobium; and
   no more than 0.01% silicon.

3. The atomized alloy powder according to claim 1, wherein the alloy particles comprise, by weight percentage,
   13.75% to 14.25% chromium;
   4.75% to 5.25% nickel;
   0.13% to 0.17% carbon;
   0.13% to 0.17% titanium;
   0.4% to 0.6% molybdenum;
   0.05% to 0.15% vanadium;
   0.4% to 0.6% tungsten;
   no more than 0.01% niobium; and
   no more than 0.01% silicon.

4. The atomized alloy powder according to claim 3, wherein the powder has been subjected to an additive manufacturing process and without being subjected to aging or solution heat treatment, the atomized alloy powder has:
   an elongation of 15% to about 21% for an x-y specimen; and
   a hardness value of 44 to 50 HRC.

5. The atomized alloy powder according to claim 1, wherein the powder has been subjected to an additive manufacturing process and without being subjected to aging or solution heat treatment, the atomized alloy powder has a yield strength of about 1000 MPa to about 1140 MPa for an x-y specimen.

6. A method of using an atomized alloy powder in additive manufacturing, the method comprising:
   receiving the atomized alloy powder comprising alloyed particles, the alloyed particles comprising, by weight percentage:
   13.25% to 14.75% chromium;
   4.5% to 5.5% nickel;

0.13% to 0.17% carbon;
0.01% to 0.31% titanium;
no more than 0.01% niobium;
no more than 0.01% silicon;
no more than 0.01% copper;
no more than 0.01% manganese;
no more than 0.02% nitrogen;
no more than 0.01% sulfur;
no more than 0.04% oxygen; and
wherein the alloyed particles have a ratio of chromium to nickel, by weight, between 2.4 and 3.3,
the balance of weight percent comprising iron and incidental elements and impurities,
conducting additive manufacturing with the atomized alloy powder to generate a manufactured article, the additive manufacturing being performed under an argon (Ar) atmosphere; and
removing a manufactured article having a microstructure that is less than 30% δ-ferrite and γ-austenite and is greater than 70% martensite.

7. The method according to claim 6, wherein the alloyed particles include, by weight percentage,
13.75% to 14.25% chromium;
4.75% to 5.25% nickel;
0.14% to 0.16% carbon;
0.12% to 0.18% titanium;
0.01% to 0.21% vanadium;
0.4% to 0.6% tungsten; and
0.4% to 0.6% molybdenum.

8. The method according to claim 6, wherein the alloyed particles include, by weight percentage:
13.75% to 14.25% chromium;
4.75% to 5.25% nickel;
0.11% to 0.15% carbon; and
0.02% to 0.14% titanium.

9. The method according to claim 8, wherein the completed manufactured article has:
a hardness value of 44 to 50 HRC; and
an elongation of 15% to about 21% for an x-y specimen.

10. The method according to claim 9, further comprising preheating a build plate to a temperature between 175° C. and 200° C.;
wherein the completed manufactured article has:
a microstructure that is less than 1% δ-ferrite, less than 1% γ-austenite, and about 99% martensite;
an elongation of 10% to 14% for an x-y specimen; and
a yield strength between 1125 MPa and 1135 MPa for an x-y specimen.

11. The method according to claim 6, wherein the alloyed particles have a ratio of chromium to nickel, by weight, between 2.7 and 2.9.

12. The method according to claim 8, wherein the completed manufactured article has:
an ambient toughness ($K_{IC}$) between 185 and 235; and
a pitting potential greater than 0 mV SCE.

* * * * *